US005731909A

United States Patent [19]

Schachar

[11] Patent Number: 5,731,909
[45] Date of Patent: Mar. 24, 1998

[54] METHOD FOR INCREASING THE POWER OF AN ELASTICALLY DEFORMABLE LENS

[76] Inventor: Ronald A. Schachar, P.O. Box 796728, Dallas, Tex. 75379

[21] Appl. No.: 658,233

[22] Filed: Jun. 4, 1996

Related U.S. Application Data

[62] Division of Ser. No. 439,942, May 12, 1995.

[51] Int. Cl.[6] .................. G02B 15/00; G02B 3/14; G02B 7/02
[52] U.S. Cl. .............. 359/676; 359/666; 359/814; 359/824
[58] Field of Search .................. 359/665, 666, 359/667, 676, 814, 824

[56] References Cited

U.S. PATENT DOCUMENTS

| 1,269,422 | 6/1918 | Gordon | 359/666 |
| 3,598,479 | 8/1971 | Wright | 351/41 |
| 4,383,175 | 5/1983 | Toepke | 250/368 |
| 4,444,471 | 4/1984 | Ford et al. | 359/676 |
| 4,514,048 | 4/1985 | Rogers | 359/676 |
| 4,712,882 | 12/1987 | Baba et al. | 359/665 |
| 4,783,155 | 11/1988 | Imataki et al. | 359/666 |
| 4,783,233 | 11/1988 | Yasumuro et al. | 156/227 |
| 4,784,479 | 11/1988 | Ikemori | 359/666 |
| 4,802,746 | 2/1989 | Baba et al. | 359/667 |
| 4,859,041 | 8/1989 | Suda | 359/676 |
| 4,913,536 | 4/1990 | Barnea | 351/41 |
| 5,484,096 | 1/1996 | Tank | 228/121 |

OTHER PUBLICATIONS

Schachar, R.A., et al., "A Physical Model Demonstrating Schachar's Hypothesis of Accommodation", Ann. Ophthalmol. 1994:26:4–9.
Schachar, R.A., et al., "Experimental Support for Schachar's Hypothesis of Accommodation", Ann. Ophthalmol. 1993:25:404–409.
Schachar, R.A., et al., "Mathematical Proof of Schachar's Hypothesis of Accommodation", Ann. Ophthalmol. 1993:25:5–9.
Schachar, R.A., et al., "Pathophysiology of Accommodation and Presbyopia. Understanding the Clinical Implications", J. Florida Med. Assoc. 81, 268–271 (1994 Apr.).

Primary Examiner—Scott J. Sugarman
Attorney, Agent, or Firm—Vorys, Sater, Seymour & Pease

[57] ABSTRACT

A variable focus lens is constructed by making small changes in the equatorial diameter of an elastically deformable lens. The lens may be deformed by radial tension exerted in a plane generally perpendicular to the optical axis. The radial tension may be exerted by radially acting mechanical apparatus or by means of rings embedded or attached at the equator of the lens, whose diameter can be altered by heating, or by imposition of electrical or magnetic fields.

23 Claims, 7 Drawing Sheets

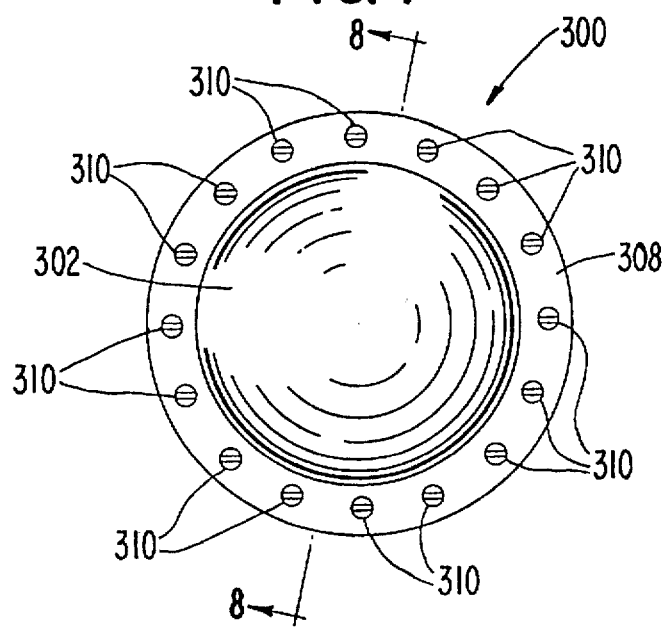
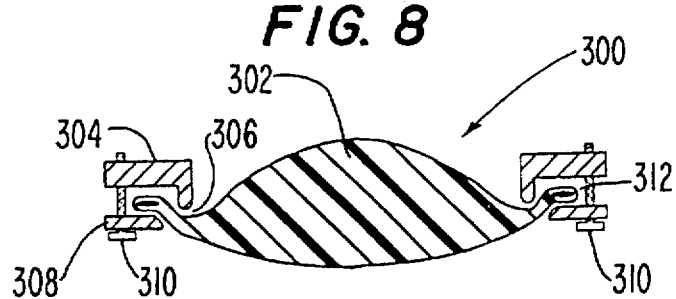
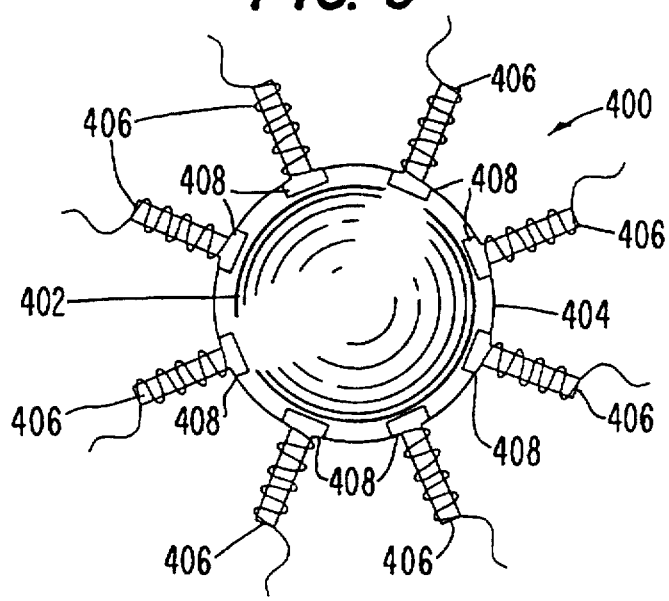

METHOD FOR INCREASING THE POWER OF AN ELASTICALLY DEFORMABLE LENS

This is a divisional of application Ser. No. 08/439,942 filed on May 12, 1995.

BACKGROUND OF THE INVENTION

1. Field of the Invention

This invention relates to variable focus lenses amd more particularly to elastically deformable lenses wherein the optical power of the lens can be varied by small changes of its equatorial diameter.

2. Brief Description of the Prior Art

Variable focus lenses and lens systems have come to be extensively used because they provide convenient solutions to problems which frequently arise in applied optics. Optical systems incorporating such lenses can, for example, provide a focused image of objects at varying distances from the lens on an image plane without changing the distance between the lens and the image plane. They can also be used in optical systems that provide varying magnification without changing lenses.

A number of types of variable focus lenses have been devised. However, the design most widely used at present in optical instruments such as cameras, telescopes, binoculars and microscopes is a multi-element lens wherein the focal length is varied by changing the internal spacing of one or more of the elements along the optical axis.

Another class of variable focus lenses relies on changes in the refracting power of a single lens element effected by changes in the curvature of the refracting surfaces or the refractive index of the lens material.

One type of such single-element variable focus lenses uses a fluid-filled chamber formed by flexible membranes whose curvature can be varied. U.S. Pat. No. 1,269,422, to Gordon, discloses spectacle lenses comprising a pair of optical surfaces formed, e.g., of thin glass, joined at their peripheries to form a chamber which is filled with a transparent liquid. Each lens is mounted in a rim which can be made smaller by tightening a tangent screw to decrease the circumference of the rim. Such tightening is disclosed to increase the refractive power of the lens.

Another design for a variable focus lens uses a fluid-filled chamber with flexible walls wherein the curvature of the walls can be varied by adjusting the amount of fluid contained in the chamber. Such lenses can involve a simple balloon or bladder made of transparent material inflated with a liquid of an appropriate refractive index. Other structures having flexible refracting surfaces whose curvature is adjusted by varying the volume and/or pressure of a fluid within the lens body have also been devised. Lenses of this type are disclosed, for example, in U.S. Pat. No. 3,598,479, to Wright, and U.S. Pat. No. 4,913,536, to Barnea.

Other variable focus lenses use elastically deformable materials that are deformed by various surrounding structures in order to vary the curvature of the optical surfaces. Such lenses are disclosed e.g., in U.S. Pat. No. 4,783,155, to Imataki et al.; U.S. Pat. No. 4,784,479, to Ikemori; U.S. Pat. No. 4,802,746, to Baba et al.; and U.S. Pat. No. 4,859,041, to Suda.

An elastically deformable lens of variable focal length is also disclosed in U.S. Pat. No. 4,444,471, to Ford et al. Ford discloses changing the focal length of an elastomeric biconvex lens by radially stretching the lens by a substantial amount so that the curvature of the optical surfaces is reduced and the refracting power of the lens is thereby also reduced. However, Ford does not disclose or discuss the changes in optical power that occur in an elastomeric lens when it is radially stretched by only a few percent of its diameter.

U.S. Pat. No. 4,712,882, to Baba et al., discloses a variable focus lens comprising a transparent elastic cylindrical body having a radially varying index of refraction wherein the optical power is reduced by radially expanding the cylinder, thereby placing the lens under radial tension. The radial expansion of the lens is accomplished by a piezoelectric element surrounding the cylindrical body of the lens and bonded thereto. Baba discloses that such radial expansion also reduces the positive curvature of refracting optical surfaces at the ends of the cylinder or induces increased negative curvature. In Baba's variable focus lens the radial expansion is conducted generally uniformly along the entire axis of the cylinder.

Other methods for producing a variable focus lens have involved controlling the refractive index of the material from which the lens is made. For example, in a lens formed from a liquid crystal, a varying electric current across the liquid crystal lens can produce a lens of variable power. Other crystals, whose index of refraction can be continuously varied by electrical or mechanical means, can also be used in the manufacture of variable focus lenses.

These previous methods of constructing a variable focus lens have certain deficiencies particular to each of the techniques. For example, moving lens elements within a multielement lens system requires relatively large, heavy and precisely constructed mechanical lens cells, tracks and linkages. In lenses made with material having a variable refractive index the size has had to be limited in order to maintain adequate optical clarity. Any hitherto disclosed variable focus lenses using a fluid-filled balloon or bladder have required a reservoir and means for moving fluid into and out of the lens, which introduces impractical complications. Furthermore, in order to produce continuously variable lenticular astigmatism, the known lenses must be tilted or have unusual shapes.

Accordingly, a need has continued to exist for a method to produce a variable focus lens in which the spherical and astigmatic optical power of the lens can be altered without the need for large mechanical movements, unusual shapes, changes in the index of refraction of the material, or the use of a balloon lens with a reservoir.

SUMMARY OF THE INVENTION

A variable focus elastically deformable lens has now been devised wherein the optical power is varied by radial stretching of the lens over a few percent of its diameter. The lens comprises a transparent elastic body having two opposed optical refracting surfaces intersecting an optical axis and a periphery surrounding the optical axis and extending between the refracting surfaces, and means for expanding the periphery of the elastic body in a plane generally perpendicular to the optical axis by an amount not exceeding about 5% of its relaxed diameter. The invention also encompasses a method of increasing the optical power of an elastically deformable lens by expanding the periphery of the lens in a plane generally perpendicular to the optical axis of the lens by an amount not exceeding about 5% of its relaxed diameter.

Accordingly it is an object of the invention to provide a variable focus lens.

A further object is to provide a variable focus lens wherein the optical power of the lens is varied by inducing small changes in the equatorial diameter of an elastically deformable lens.

A further object is to provide a method for producing a variable focus lens by inducing small increases in the equatorial diameter of an elastically deformable lens.

A further object is to provide a method for producing a variable focus lens by inducing small decreases in the equatorial diameter of a lens.

A further object is to provide a method for producing a variable focus lens wherein the astigmatic power of the lens in a given meridian is varied by inducing small changes in the equatorial diameter in different meridians of the lens.

A further object of the invention is to provide a method for producing a variable focus lens wherein small changes in the equatorial diameter of the lens are produced by electrical means.

A further object of the invention is to provide a method for producing a variable focus lens wherein small changes in the equatorial diameter of the lens are produced by magnetic means.

A further object of the invention is to provide a method for producing a variable focus lens wherein small changes in the equatorial diameter of the lens are produced by magnetostrictive means.

A further object of the invention is to provide a method for producing a variable focus lens wherein small changes in the equatorial diameter of the lens are produced by thermal means.

A further object of the invention is to provide a method for producing a variable focus lens wherein small changes in the equatorial diameter of the lens are produced by mechanical means.

A further object of the invention is to provide a method for producing a variable focus lens wherein small changes in the equatorial diameter of the lens are produced by chemical means.

A further object of the invention is to produce a variable focus astigmatic lens.

Further objects of the invention will become apparent from the description of the invention which follows.

BRIEF DESCRIPTION OF THE DRAWINGS

FIG. 7 shows a front elevational view of another embodiment of the variable focus lens of this invention wherein radial stretching means incorporating adjusting screws is used to vary the focal length of the lens.

FIG. 8 shows a lateral sectional view of the variable focus lens of FIG. 7 along the line 8—8.

FIG. 9 shows a front elevational view of another embodiment of the variable focus lens of this invention wherein a radially acting electrically actuated solenoids are used to vary the focal length of the lens.

DETAILED DESCRIPTION OF THE INVENTION AND PREFERRED EMBODIMENTS

Figure 1:
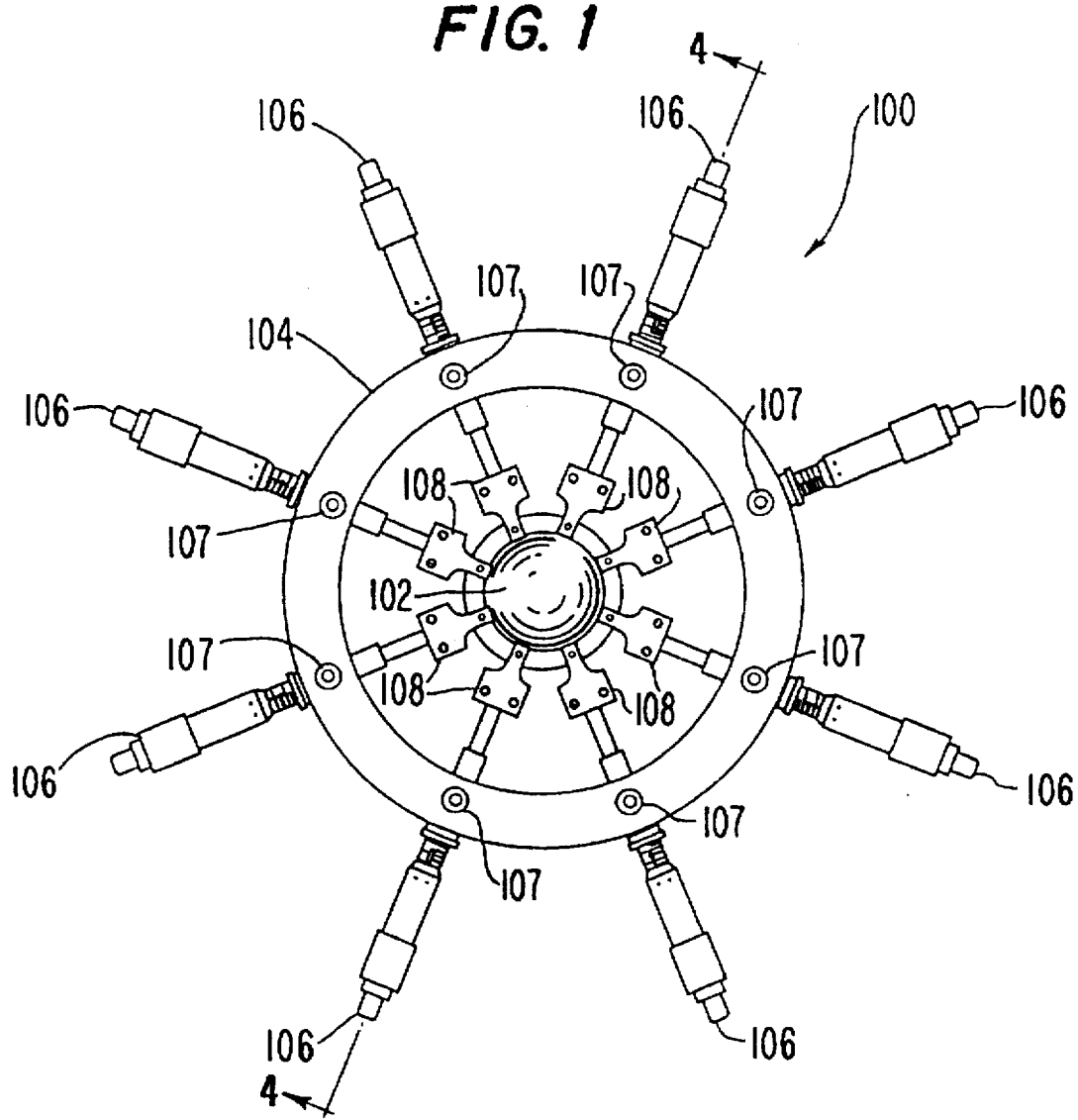
FIG. 1 shows an anterior elevation view of an experimental variable focus lens of this invention illustrating the principle of its operation.

This invention is based on discoveries regarding the change in curvature of optical surfaces of an elastically deformable optical lens when its periphery is radially expanded by a small amount in a plane generally perpendicular to the optical axis. It is natural to assume that radial stretching of such an elastic lens would result in the center thickness of the lens being decreased with resulting increase in the radii of curvature of the optical refracting surfaces which would cause the optical power of the lens to be reduced. Indeed, a decrease in optical power may be observed in an elastomeric lens when it is severely stretched as taught and illustrated in Ford, U.S. Pat. No. 4,444,471. However, surprisingly, and contrary to what one might expect and what is suggested by the disclosures of Ford, when an elastically deformable lens is subjected to radial stretching of a few percent of its diameter, the optical power actually increases, and the increases may be rather substantial. It has now been found that expanding the equatorial diameter of an elastically deformable lens by a small amount, not exceeding about 5% of the relaxed diameter of the lens, in a plane generally perpendicular to the optical axis produces a flattening of the lens curvature in the peripheral zone of the lens and an increase in curvature in the central zone resulting in an increase in the optical power of the central zone of the lens.

Consequently, the invention encompasses a method of increasing the optical power of a lens comprising a transparent elastically deformable lens body having two refracting surfaces intersecting an optical axis and a periphery surrounding the optical axis by expanding the periphery of the lens body in a plane generally perpendicular to the optical axis by an amount not exceeding about 5% of the relaxed diameter of the periphery.

The invention also includes an elastically deformable lens whose optical power can be varied by small changes in its equatorial diameter. Such a lens comprises an elastically deformable transparent lens body having two optically refracting surfaces intersecting an optical axis and a periphery surrounding said optical axis and means for expanding the periphery of the lens body by an amount not exceeding about 5% of the relaxed diameter of the periphery.

The invention is applicable to all elastically deformable lenses in conventional lens shapes, i.e., biconvex, biconcave, plano-convex, plano-concave, concavo-convex, or biplano lenses, whether the refracting surfaces are spherical, aspheric, cylindrical, toric or the like. That is, the invention extends to positive, negative and zero-power lenses of all types and thicknesses, including those made from homogeneous optical materials, graded index optical materials (GRIN lenses), fluid-filled lenses of all shapes and wall thicknesses, whether of constant or variable wall thickness, Fresnel lenses, and diffractive optical elements (DOE).

According to the invention the focal length or optical power of an elastically deformable lens is altered by small changes in its equatorial diameter. Typically, an elastically deformable lens is mounted in a cell that initially exerts enough tension to support the lens and stabilize it in a rest, or stabilized position. The mounting and tension-exerting elements are ordinarily positioned about the periphery or equator of the lens and are disposed to exert tension in a plane oriented generally perpendicular to the optical axis of the lens. Ordinarily the initial stabilizing tension will be relatively small and will produce no substantial distortion of the natural shape of the lens. In this application the conformation of the lens in this state of little or no tension will be referred to as the relaxed state of the lens. In order to alter the focal length or optical power of the lens the radial tension is increased to a value that causes the equatorial diameter of the lens to be increased slightly, up to 5% of its relaxed diameter, and preferably up to 2–3% of its relaxed diameter. As the equatorial diameter undergoes this small increase, one or both of the optical refracting surfaces of the lens are changed in a unique way. The refracting surface becomes flattened near the periphery with consequent steeper curvature in the central zone of the lens, i.e., the zone immediately surrounding the optical axis. The result is that for such small increases in equatorial diameter, the optical power of the central zone of the lens is increased, not decreased as might be expected. Correspondingly, the focal length of central zone of the lens is shortened.

The elastically deformable lens of the invention may be constructed of any optically suitable material that can undergo elastic deformation of sufficient magnitude to exhibit the change in optical power of the lens according to the invention. The material must be generally transparent to wavelengths that are intended to be focused by the lens. Thus, lenses intended for use in the visible region of the spectrum must be generally transparent at visible wavelengths, while lenses intended for use at infrared wavelengths must be transparent to infrared radiation, but not necessarily to visible radiation. Evidently, some scattering of radiation and optical imperfection can be tolerated in the lens if it is intended for non-critical use. However, in general the material should be as transparent as possible in the wavelength region of interest.

The elastically deformable lens element used in lenses according to the invention can be made of solid elastomeric materials formed into the shape of the resting lens element. The solid elastomeric lenses may be made, for example, of synthetic polymers such as silicone rubbers, polyethylene, polypropylene, modified polystyrenes, transparent polyurethane elastomers and the like. It will be recognized by one skilled in the art that the material used should desirably exhibit high transparency, i.e., low optical absorbance and low light scattering at the wavelength of interest. The properties of the different elastomeric optical materials are well known or can be measured. Consequently, the practitioner will have no difficulty selecting an appropriate material for a given lens application. Such lenses may be molded or cast by conventional procedures in the shape of biconvex, plano-convex, biconcave, plano-concave, plano-plano, or meniscus lenses and the like. The lenses may also be formed by machining optical surfaces onto transparent elastomeric bodies by conventional procedures for machining such materials, e.g., by rigidifying them by chilling and performing the machining operations in that state of the material.

The lens bodies for use in the invention may also be fluid- or gel-filled bladders or balloons. A lens of this type may be constructed by forming a balloon or bladder of transparent material, e.g., of polyethylene terephthalate, and filling the balloon with a fluid material, e.g., liquid or gas, or a transparent low-scattering deformable gel. Suitable materials for filling a balloon lens include water, aqueous solutions of water-soluble inorganic and organic solids, organic liquids, mixtures of water and water-miscible organic liquids and silicone oils. Organic liquids and soluble inorganic salts containing halogen such as chlorine, bromine and iodine in covalently bonded or ionic form are useful as filling materials of relatively high refractive index. Mixtures of water and water-miscible organic compounds such as glycols and polyethylene glycols are useful filling materials.

The balloon or bladder is then mounted in position on an optical axis and suspended thereon by means connected to the periphery of the lens for exerting radially outwardly directed tension in a plane passing through the lens body. When a low level of tension has been exerted, the lens assumes a stable shape within the mounting means, i.e., is in a stabilized state, defined in this application as the relaxed state of the lens. Further radial tension on the periphery of the fluid- or gel-filled lens body that expands the periphery of the lens body by up to 5% causes the optical surfaces to undergo the characteristic change in shape of this invention, whereby the curvature of the central zone of the lens is increased, thereby increasing the optical power of the lens.

Any method or procedure that can exert a radial tension on the periphery or equator of a lens can be used to vary the optical power of an elastically deformable lens according to this invention. The means for exerting the tension need not itself exert tension in a direct radial direction with respect to the optical axis of the lens. It is sufficient that the resultant of all tension exerted on the periphery of the lens causes an increase in the diameter of the periphery of the lens.

Accordingly, the force applied to the periphery of the lens to expand its equatorial diameter may be applied by direct mechanical means such as radially oriented screws, hydraulic or pneumatic cylinders, electric solenoids, mechanical cams and cam followers such as those used in iris diaphragm mechanisms and the like. The mechanism can be fastened to the periphery of the lens by conventional means such as clamping, bonding or the like. The tensioning mechanism should be capable of exerting force in a generally radially outward direction around the periphery of the lens. Although the tension on the lens body must be exerted outward in a plane generally perpendicular to the optical axis, the mechanical device that is the source of the tension may be located elsewhere than in the plane in which the radial expansion of the lens body takes place. Nevertheless, the source of the tension is usually located near the lens and exerts its radially outward force on the lens body either directly or through mechanical coupling elements that convert the force generated by the actuating element into a radially outward tension on the lens body. In particular, the actuating element may operate parallel to the optical axis and the tension generated by the axial motion of the tensioner may be converted to a radial outward tension on the lens body by means of tendons and pulleys, cranks, or the like. In a preferred embodiment the radial tension on the lens body may be generated by providing a flexible flange radially extending from the periphery of the lens body, and drawing the flange in a direction parallel to the optical axis over a circular anvil having a diameter somewhat greater than that of the periphery of the lens body. The axial traction on the flexible flange is converted to a radial tension on the periphery of the lens body which can increase its diameter and thereby increase the optical power of the lens.

A preferred variable focus lens according to the invention comprises an elastically deformable lens body having an actuating ring of metal or other material bonded to the periphery of the lens body or embedded in the lens body adjacent to its periphery. The actuating ring is constructed of a material that can expand its diameter in response to a change in its physical or chemical environment, thereby altering the diameter of the lens body in the plane of the ring. If a metal actuating ring is used, the diameter of the ring can be expanded by heating the ring, thereby expanding the periphery of the lens body and increasing the optical power of the lens. The ring can be heated by any conventional heating method. For example, the ring can be heated by conduction of heat from an electrical heating element positioned adjacent to or surrounding the metal ring. In such an arrangement the temperature of the actuating ring can be controlled by adjusting the electric current in the heating element. Alternatively, the ring could be heated by electric currents within itself, either by inserting an insulating section in the ring and supplying electric current to the ends of the conducting portion of the ring through electrodes, or by generating eddy currents in the metal ring by electromagnetic induction using an external source of an alternating electromagnetic field. A metallic actuating ring can also be heated by radiant heat directed onto it from an external source of radiation, e.g. infrared radiation. Continuous variation of the temperature of an expandable metal actuating ring produces a continuous variation in the optical power of the lens according to the invention. It is also possible to provide for a relatively abrupt change in optical power at a predetermined temperature by making the actuating ring from a shape memory metal which alters its diameter at a given temperature when it is heated or cooled. If the ring is made of a magnetostrictive material, its diameter can be altered by subjecting it to a magnetic field. The actuating ring may also be made of a piezoelectric material that changes its dimensions when an electric field is imposed on it, for example, a ring of rectangular cross section made from a piezoelectric ceramic with electrodes applied to or plated on opposite sides of the ring for applying an electric field.

The actuating ring may also be comprised of bimetallic elements arranged to exert an outward force on the periphery of the lens body when the temperature is varied. Evidently, such elements can be arranged to increase the equatorial diameter of the lens body either with increasing or decreasing temperature.

The actuating ring may be comprised of a material which changes its dimensions in response to a change in its chemical environment, thereby increasing the diameter of the lens body.

A number of embodiments of the variable focus lens of the invention are illustrated in the drawings.

Figure 2:
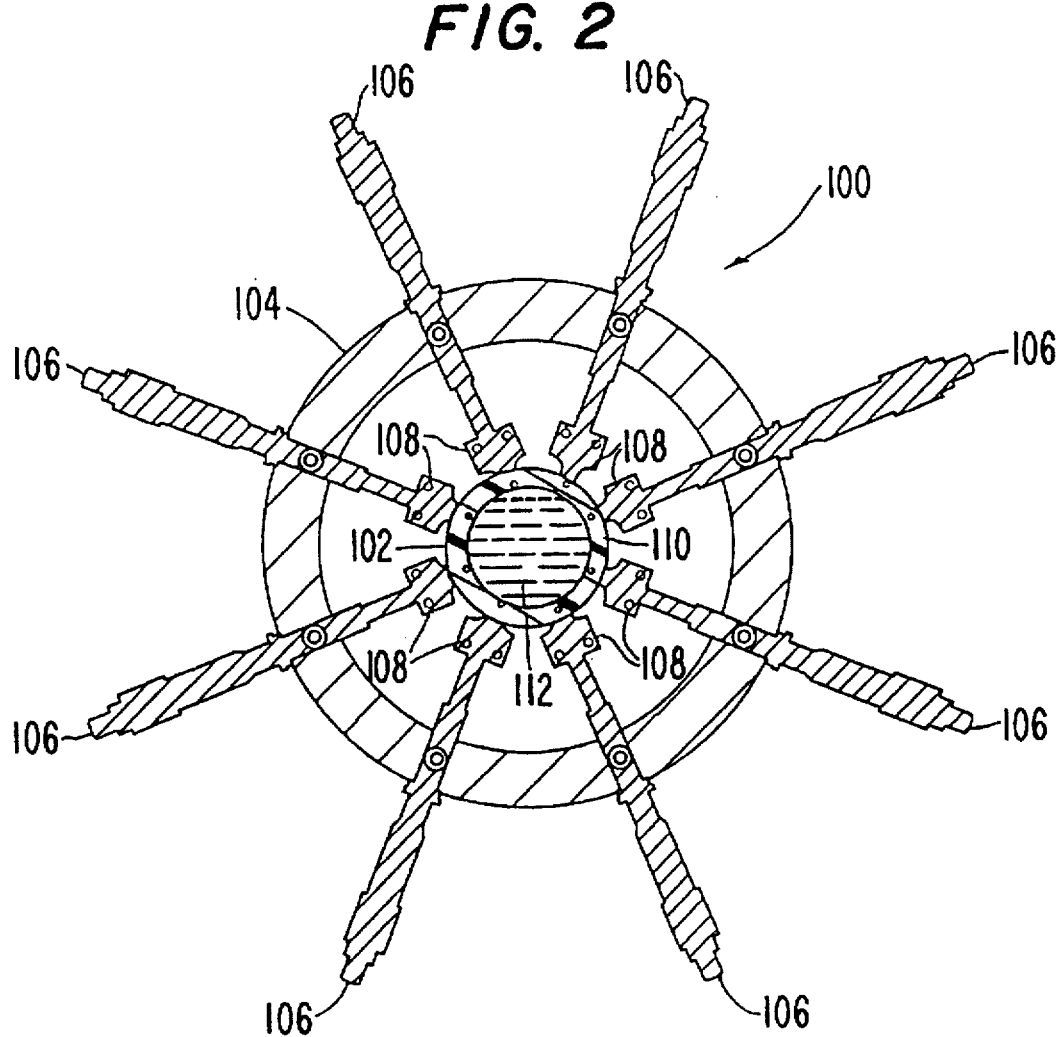
FIG. 2 shows an anterior sectional view of the variable focus lens of FIG. 1 taken along the line 2—2 in FIG. 3.
Figure 3:
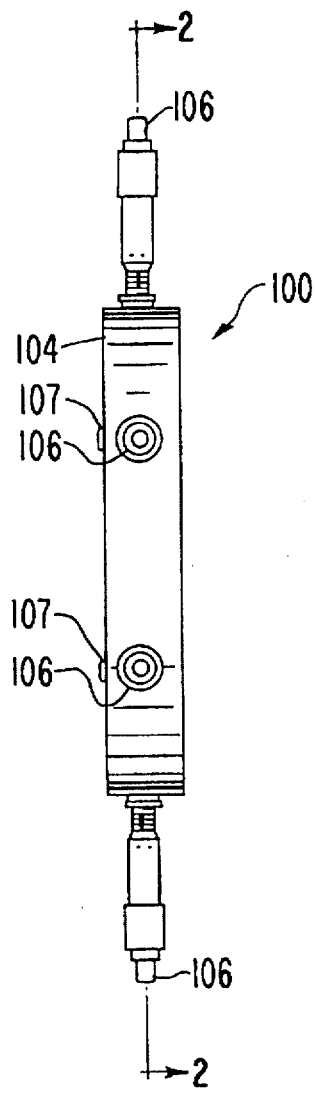
FIG. 3 shows a side view of the variable focus lens of FIG. 1.
Figure 4:
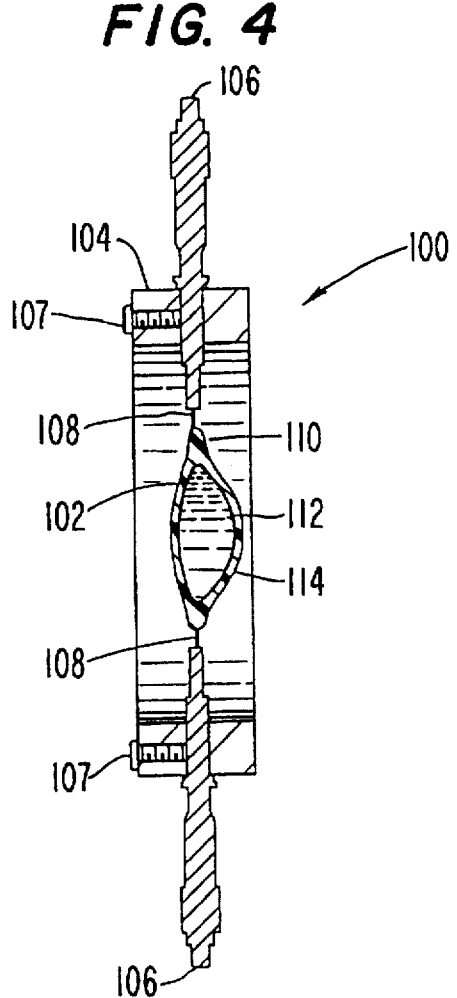
FIG. 4 shows a side cross-sectional view of the variable focus lens of FIG. 1 taken along the line 4—4 in FIG. 1.

FIGS. 1–4 illustrate an experimental apparatus 100 used for evaluating and illustrating the lens and method of the invention. A biconvex elastically deformable lens 102, e.g., a lens made of a transparent bladder, having a wall 114 and a surrounding equatorial lip or rim 110, filled with water 112, is mounted within a rigid mounting ring 104. FIG. 1 shows a front elevational view of the apparatus, while FIG. 2 shows a front sectional view taken through the plane of the periphery or equator 1 ... of the lens 102. FIGS. 3 illustrates a side view of the apparatus 100 looking perpendicular to the line 4—4 in FIG. 1, while FIG. 4 illustrates a cross section taken along the line 4—4 in FIG. 1. The mounting ring 104 supports eight micrometers 106, with non-rotating spindles, which are fixed in mounting ring 104 with setscrews 107 or the like. The spindles of the micrometers 106 are arranged to move radially in and out as their thimbles are turned. At the inner end of each micrometer is a clamp 108 which securely clamps the rim 110 of lens 102. The entire apparatus 100 can be mounted on an optical bench, not shown, by conventional mounting means, not shown, for evaluating the change in focal length produced by increasing the equatorial diameter of the lens 102. Once the lens 102 has been clamped in place centrally in the apparatus 100, the micrometers 106 can be adjusted to provide an initial stabilizing tension on the peripheral lip or flange 110 of the lens to establish the initial conditions. In evaluating the effect of increasing the equatorial diameter, the focal length of the lens in its initial condition is measured by conventional means. The micrometers 106 are then adjusted to produce small symmetrical outward displacement of the peripheral rim 110 of the lens 102, and the focal length is again determined. For an elastically deformable lens in such an apparatus it has been found that the optical power of the lens is increased as the equatorial diameter is increased up to about 5%.

Other apparatus for exerting radial tension and producing small increases in equatorial diameter may be used in variable focus lenses according to the invention.

Figure 5:
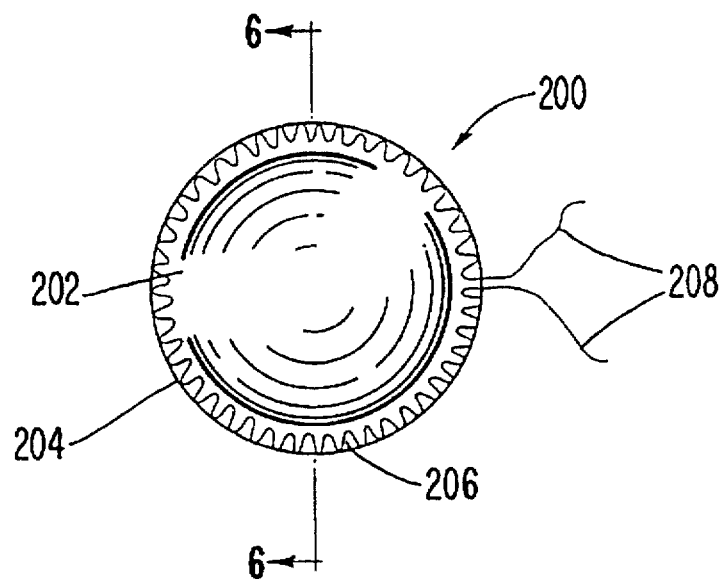
FIG. 5 shows a front elevational view of another embodiment of the variable focus lens of this invention which incorporates a metal ring heated by an electric heating element as an actuating device.
Figure 6:
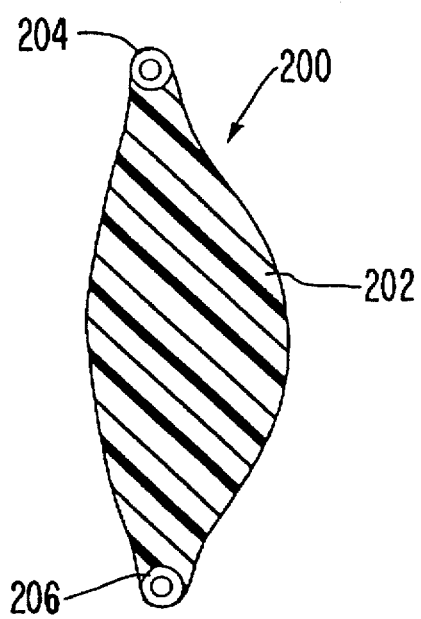
FIG. 6 shows a lateral sectional view of the variable focus lens of FIG. 5 along the line 6—6.

Another variable focus lens 200 the invention is illustrated in FIGS. 5 and 6. An elastically deformable lens 202 has an annular electrically resistive heating coil 206 embedded therein within the rim 204 of the lens near the equator 205. The coil 206 may be heated by passing an electric current therethrough, thereby increasing its diameter which concomitantly increases the equatorial diameter of the lens. FIG. 5 is a front elevational view showing the lens 202 having a heating coil 206 embedded therein as a controllable source of heat. FIG. 6 shows a side cross-sectional view of the lens of FIG. 5 along the line 6—6 in FIG. 5.

Figure 10:
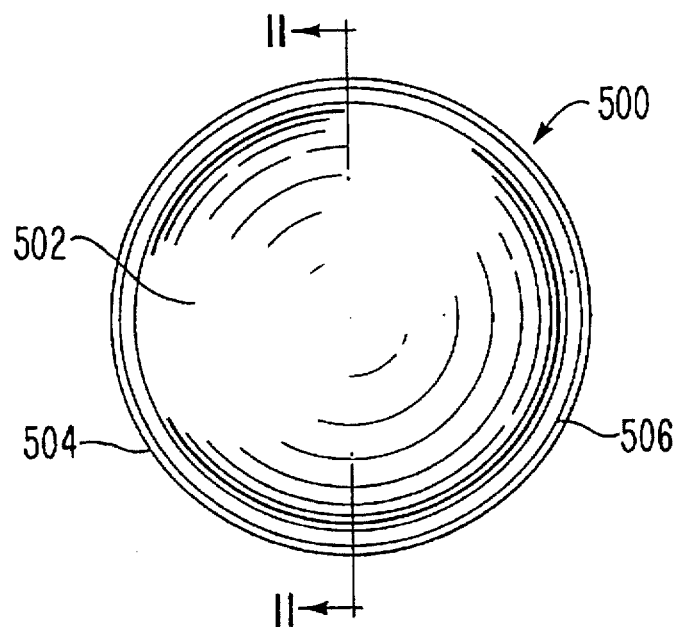
FIG. 10 shows a front elevational view of another embodiment of the variable focus lens of this invention wherein a thermally expandable metal ring is embedded in the periphery of an elastomeric lens.
Figure 11:
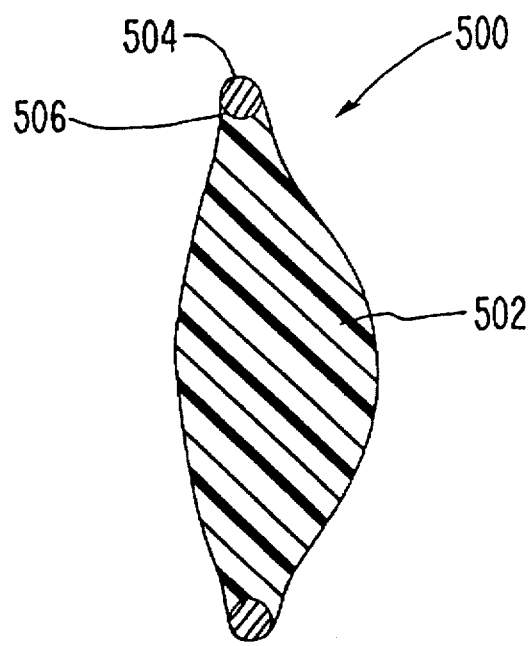
FIG. 11 shows a lateral sectional view of the variable focus lens of FIG. 10 along the line 11—11.

An embodiment 500 of the variable focus lens of the invention is illustrated in FIGS. 10 and 11. This embodiment of the invention uses a metal ring 506 embedded in the rim 504 of the lens 502 or bonded thereto. When the metal ring 506 is heated it expands, thereby increasing the equatorial diameter of the lens 502 and increasing its optical power. The metal ring 506 could be heated by an adjacent heating coil of the type illustrated in FIGS. 5 and 6. The metal ring could be heated by other means as well. For example, the ring could be made of a ferromagnetic material and the lens could be surrounded with a coil carrying an alternating current which would heat the ring by electromagnetic induction. The ring could also be heated by radiant energy.

Another embodiment of the invention wherein the radial tension that increases the radial diameter is applied by tensioning screws that stretch the periphery of the elastically deformable lens over an anvil is illustrated in FIGS. 7 and 8. In this apparatus 300 an elastically deformable lens 302 is mounted in a tension cell 304 by a clamping ring 308 actuated by adjusting screws 310. The adjusting screws 310 may be initially adjusted to provide an initial stabilizing tension on the lens 302. Then, by tightening the adjusting screws 310 the periphery 312 of the lens 302 is drawn over the circular anvil 306 thereby increasing the equatorial radial diameter of the iens 302. The result is an increase in optical power when the equatorial diameter is increased by a few percent.

FIG. 9 illustrates schematically an embodiment of the invention 400 wherein an elastically deformable lens 402 is mounted by clamps 408 fastened to solenoids 406. The solenoids 406. are in turn mounted to any conventional supporting structure not shown. When the solenoids 406 are actuated, the equatorial diameter of the lens 402 is increased, thereby increasing the optical power of the lens.

The equatorial ring of an elastically deformable variable focus lens of this invention may be a piezoelectric material that expands under the application of an electric voltage, or a magnetostrictive ring that expands when placed in a magnetic field. A bimetallic ring may also be used which changes its diameter when heated. The ring may also be made of shape memory alloy which will change diameter at a specific transition temperature. The ring need not be continuous around the entire circumference of the lens, but may be comprised of two or more segments. It is sufficient if the combined action of the segments when their size is altered, e.g., by heating, results in a change in the equatorial diameter of the lens. In general, any material, metal, plastic, composite material or the like can be used provided that its diameter can be altered by the application of some control input. Thus, rings whose diameter can be altered by mechanical adjustment are suitable for use in the variable focus lens of this invention. Preferably such rings should provide a symmetric tension around the equator of the lens in order to produce a symmetrical lens. Even rings of material whose diameter is altered by exposure to certain chemical conditions, e.g., polymers whose mechanical dimensions are altered by a change in the pH of their environment, may be used in the variable focus lenses of this invention.

It will be understood by those skilled in the art that the tension ring which provides the change in equatorial diameter of a lens of this invention may be embedded within the lens itself, preferably near the equator of the lens, or may be external to the lens and fastened to the equator of the lens by any suitable means such as clamping, bonding, adhesive fastening or the like.

The method of this invention also has utility in the production of a variable focus astigmatic lens. By inducing different amounts of small displacement changes in different meridians of the equatorial diameter of the elastically deformable lens, the optical power of the lens in different meridians can be controlled.

As indicated in the above discussion, a tension ring used in the variable focus lens of this invention this invention may be attached, or connected to, or imbedded in, or made an integral part of the equatorial diameter of the balloon lens or flexible elastically deformable lens. The ring need only be sufficiently rigid to exert a force on the equator of the lens in order to induce a small displacement. Such materials are well known and include suitable metals, bimetallic elements, shape memory metals, alloys, ceramics, synthetic resins, vitreous materials, porcelain, glass fibers, boron fibers, carbon fibers, alumina fibers, composite materials, or the like.

The variable focus lens of the invention may be manufactured by any conventional technique appropriate to the material used, such as machining, injection molding, vacuum forming, pressure forming, heat molding, compression forming, stamping and the like.

EXAMPLE

This example illustrates the variation in optical power of an elastically deformable lens that can be achieved by making small changes in the equatorial diameter of the lens.

An experimental apparatus of the type illustrated in FIGS. 1–4 was constructed and used to measure the change in optical power achievable by making small changes in the equatorial diameter of an elastically deformable lens tested in the apparatus.

Three transparent plastic, polyvinyl chloride balloons were constructed of polyvinyl chloride having a Young's modulus of 2.4–4.1 GPa and an index of refraction of 1.50–1.55. The balloons were made by heat sealing two webs of the polyvinyl chloride material, having a thickness of about 0.5 mm, together leaving a lip of about 3 mm width extending radially outward from the equator of the lens all around the balloon. The balloons were then filled with water and sealed. The balloons were numbered 1, 2 and 3, and had dimensions as set forth in Table 1 below. The thickness was measured in an antero-posterior direction along the optical axis.

TABLE 1

| Lens No. | Equatorial Diameter (mm) | Thickness (mm) |
|---|---|---|
| 1 | 30.4 | 11.5 |
| 2 | 28.7 | 12.6 |
| 3 | 27.6 | 15.0 |

The apparatus was essentially the same as that illustrated in FIGS. 1–4. The lenses were mounted in the apparatus by clamping the equatorial lip to the spindles of eight equally spaced opposing micrometers with non-rotating spindles (L.S. Starrett Co., Athol, Mass). The mounting ring was positioned on a precision optical bench (Model L-360 -N, Gaertner Scientific, Chicago, Ill.) using a double arc goniometer to insure that the equatorial plane of the balloon lens was perpendicular to the observational axis of the optical bench. Collimated light from a collimator mounted on the optical bench was directed through a diaphragm with a 9.5 mm opening and then through the test lens. The image was observed with a microscope positioned on the optical axis. The initial diameter of the test lens was determined by adjusting the micrometers until a sharp image was observed. The micrometers were then turned so that the spindles moved outwardly, in 0.127 mm increments, ±0.005 mm. The effective focal length of the test lens was measured for each increment of equatorial diameter to a precision of ±0.12 diopters, as determined from the position of the nodal point. The increase in equatorial diameter was continued until a further increment produced only about a 1 diopter increase in effective optical power. The micrometers were then turned inwardly, in 0.127 mm increments and the effective optical power was measured until the balloon lens returned to its initial equatorial diameter. Each lens was tested through three cycles of stretching and relaxing. The increase in effective optical power with small increase in equatorial diameter (<2%) was completely reversible and reproducible.

The results of the testing for the three lenses are set forth in Table 2 below.

TABLE 2

| Lens No. | Change in Equatorial Diameter (mm) | Mean Optical Power (diopters) | Standard Deviation (diopters) |
|---|---|---|---|
| 1 | 0 | 14.4 | 0.3 |
|   | 0.254 | 17.0 | 0.8 |
|   | 0.508 | 19.0 | 0.7 |
|   | 0.762 | 20.7 | 0.2 |
|   | 1.016 | 21.5 | 0.3 |
|   | 1.524 | 22.0 | 0.3 |
|   | 1.016 | 20.7 | 0.4 |
|   | 0.762 | 19.8 | 0.8 |
|   | 0.508 | 18.2 | 0.5 |
|   | 0.254 | 15.9 | 0.7 |
|   | 0 | 13.4 | 0.1 |
| 2 | 0 | 13.6 | 0.2 |

TABLE 2-continued

| Lens No. | Change in Equatorial Diameter (mm) | Mean Optical Power (diopters) | Standard Deviation (diopters) |
| --- | --- | --- | --- |
| | 0.254 | 16.8 | 0.1 |
| | 0.508 | 19.8 | 0.2 |
| | 0.762 | 21.6 | 0.3 |
| | 1.016 | 23.0 | 0.8 |
| | 1.524 | 23.9 | 0.5 |
| | 1.016 | 22.2 | 0.9 |
| | 0.762 | 20.5 | 1.1 |
| | 0.508 | 18.1 | 0.5 |
| | 0.254 | 15.7 | 0.3 |
| | 0 | 13.8 | 0.1 |
| 3 | 0 | 13.7 | 0.5 |
| | 0.254 | 16.7 | 0.9 |
| | 0.508 | 18.5 | 0.3 |
| | 0.762 | 20.1 | 0.1 |
| | 1.016 | 20.6 | 0.7 |
| | 1.524 | 21.1 | 0.8 |
| | 1.016 | 19.2 | 0.2 |
| | 0.762 | 18.2 | 0.6 |
| | 0.508 | 16.9 | 0.5 |
| | 0.254 | 15.0 | 0.5 |
| | 0 | 13.7 | 0.5 |

Figure 12A:
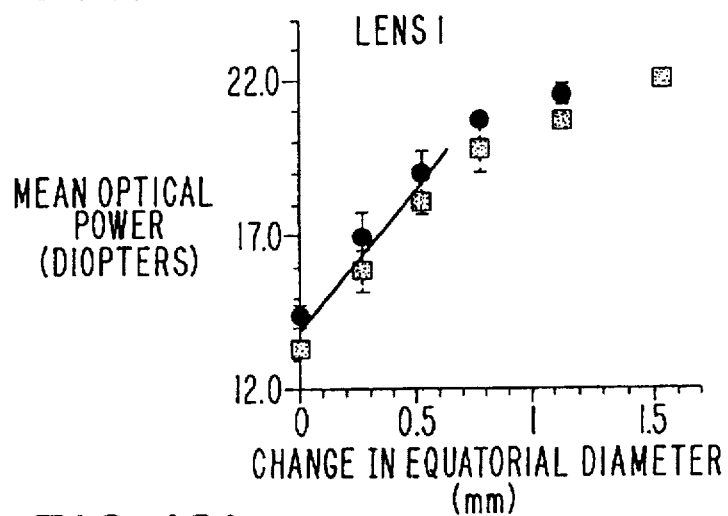
FIGS. 12a, 12b, and 12c show the experimental results of tests on three balloon lenses according to the invention, as described in the Example.
Figure 12B:
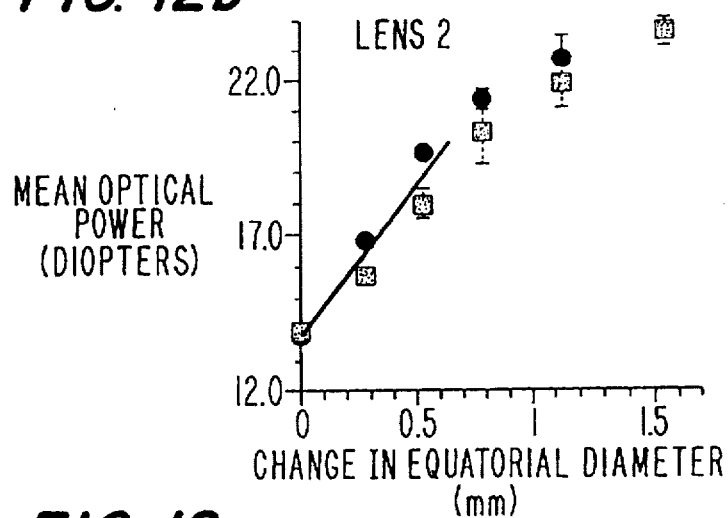
Figure 12C:
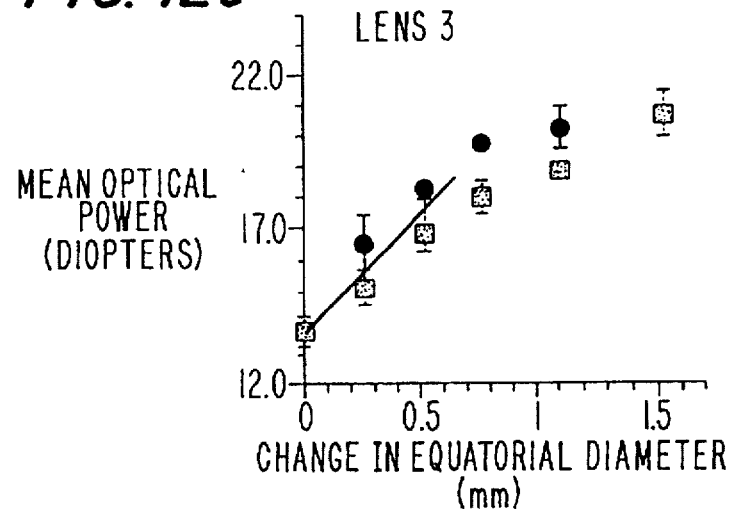

The experimental results are presented in graphical form in FIGS. 12a, 12b, and 12c in the figure the data points taken while the lens was being stretched are indicated by circles, and those taken while the lens was being relaxed are indicated by squares. The results show that the change in optical power is significant and generally linear for small changes in equatorial diameter.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than the foregoing description, and all changes which come within the meaning and range of equivalency of the claims are intended to be embraced therein.

We claim:

1. A method for increasing the optical power of an elastically deformable lens comprising
    providing a synthetic elastically deformable transparent refracting body having two optical refracting surfaces intersecting an optical axis and a periphery surrounding said optical axis and extending between said refracting surfaces, said periphery having a relaxed equatorial diameter in an initial relaxed state and
    increasing said equatorial diameter of said periphery by an amount not exceeding 5% of said relaxed equatorial diameter in a plane generally perpendicular to said optical axis.

2. The method of claim 1 wherein said refracting body is a fluid-filled bladder.

3. The method of claim 2 wherein said fluid-filled bladder is a balloon.

4. The method of claim 1 wherein said refracting body is a solid elastomeric material.

5. The method of claim 1 wherein said refracting body is a lens selected from the group consisting of biconvex, plano-convex, biconcave, plano-concave, plano-plano, and meniscus lenses.

6. The method of claim 1 wherein said equatorial diameter is increased by exerting a force radially outward from said optical axis in said plane generally perpendicular to said optical axis.

7. The method of claim 6 wherein said force is exerted by screws coupled to said periphery of said refractive body.

8. The method of claim 6 wherein said force is exerted by solenoids coupled to said periphery of said refracting body.

9. The method of claim 6 wherein said force is exerted by hydraulic cylinders coupled to said periphery of said refracting body.

10. The method of claim 6 wherein said force is exerted by pneumatic cylinders coupled to said periphery of said refracting body.

11. The method of claim 6 wherein said force is exerted by an expandable ring fastened to said periphery of said refractive body.

12. The method of claim 11 wherein said expandable ring is bonded to said periphery of said refractive body.

13. The method of claim 11 wherein said expandable ring is embedded in said refractive body adjacent to said periphery of said refractive body.

14. The method of claim 11 wherein said expandable ring is a thermally expandable metal ring.

15. The method of claim 11 wherein said expandable ring is a comprises at least one bimetallic strip.

16. The method of claim 11 wherein said expandable ring is comprised of a shape memory alloy.

17. The method of claim 11 wherean said expandable ring is heated by an electric heating element.

18. The method of claim 11 wherein said expandable ring is heated by passing an electric current therethrough.

19. The method of claim 11 wherein said expandable ring is heated by electromagnetic induction.

20. The method of claim 11 wherein said expandable ring is heated by electromagnetic radiation.

21. The method of claim 11 wherein said expandable ring is comprised of a magnetostrictive material and said ring is expanded by exposure to a magnetic field.

22. The method of claim 11 wherein said expandable ring is comprised of a piezoelectric material and said ring is expanded by exposure to an electric field.

23. The method of claim 22 wherein said electric field is applied by electrodes in contact with said piezoelectric material.

* * * * *

UNITED STATES PATENT AND TRADEMARK OFFICE
CERTIFICATE OF CORRECTION

PATENT NO. : 5,731,909
DATED : March 24, 1998
INVENTOR(S) : Ronald A. Schachar

It is certified that error appears in the above-identified patent and that said Letters Patent is hereby corrected as shown below:

At column 8, line 58, after "the" delete "iens" and insert therefor -- lens --.

At column 11, line 26, after "12c" delete "in the figure" and insert therefor -- . In these figures --.

Signed and Sealed this

First Day of June, 1999

Attest:

Attesting Officer

Q. TODD DICKINSON

Acting Commissioner of Patents and Trademarks